United States Patent Office

2,987,550
PROCESS FOR THE MANUFACTURE OF C₁₄ ALDEHYDE

William E. Stieg, Mystic, and John D. Gillis, Jr., Groton, Conn., assignors to Chas. Pfizer & Co., Inc., New York, N.Y., a corporation of Delaware
No Drawing. Filed Sept. 25, 1958, Ser. No. 763,203
7 Claims. (Cl. 260—598)

The present invention relates to a method for obtaining $C_{14}$ aldehyde in high yields. More particularly, it relates to the use of certain solvents in Darzen's glycidic ester synthesis of this aldehyde. The $C_{14}$ aldehyde has one of the following two chemical structures:

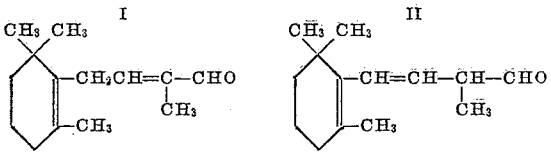

There is some evidence that the two isomers exist in equilibrium under certain circumstances (Inhoffen, Bohlmann, and Linhoff, Ann. 570, 73 (1950)). This compound is used with 1'-pentol in the synthesis of vitamin A as described in "Synthese des Vitamin A," O. Isler, W. Huber, A. Ronco, and M. Kofler, Helvetica Chimica Acta, Volume XXX, Fasciculus VI (1947), pp. 1911–1927.

A specific object of this invention is to provide a method for obtaining this valuable intermediate in a higher yield than has been previously possible. Other objects of the present invention will be obvious from the following disclosure.

As an example of accepted Darzen's procedure, a mixture of β-ionone and excess lower alkyl chloroacetate, e.g. methyl or ethyl chloroacetate, is stirred in the absence of a solvent while small portions of dry, alcohol-free sodium methylate are added, and the temperature is maintained at 0° C. When the addition has been completed, the reaction is treated with cold methanolic sodium hydroxide, keeping the reaction temperature below 10° C. This procedure may be depicted as follows:

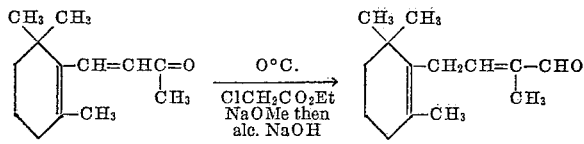

The reaction is dependent upon the purity of the β-ionone, and best results are obtained with β-ionone of at least 90% purity.

It has now been found that the $C_{14}$ aldehyde yield may be greatly increased by employing certain organic diluents in the initial phase of the reaction, that is during addition of dry solid alkoxide. When a diluent, such as dimethylformamide, pyridine, α, β, or γ picoline, dimethylacetamide, or N-ethylacetamide, is added to the mixture of β-ionone and lower alkyl chloroacetate, the yield is increased by as much as 24% for a total yield of as much as 90% of theory. The amount of diluent that is employed will vary somewhat depending upon the particular material under consideration, but in general, preferred yields are obtained if the reaction mixture prior to adding the alkoxide contains at least about 30% by weight of diluent. Higher proportions of diluent may be used. Due to the expense of solvent recovery etc., it is not practical to employ more than about 75% by weight of diluent. It is important that the diluent be essentially anhydrous. Preferably, it should have a water content of less than 0.1% by volume. The increased yields afforded by these solvents are particularly unexpected since previous experience with a variety of solvents has taught the use of solvents in this process causes a reduction in yield, or at best only equivalent results.

In accordance with the present invention the process is carried out as follows:

A mixture of β-ionone, a lower alkyl chloroacetate, the alkyl radical of which contains 1 to 4 carbon atoms, such as methyl, ethyl, or butyl chloroacetates, and the diluent are treated with small portions of dry, alcohol-free alkali metal alkoxide at a low temperature, e.g. from about 10° C. to the freezing point of the mixture. The alkali metal alkoxide may be potassium ethylate, sodium methylate, lithium methylate, etc. A cold alcoholic alkali hydroxide is then added after the addition is completed, keeping the reaction temperature below about 10° C. Subsequent stirring of the reaction mixture for approximately 15 to 60 minutes hastens the formation of the $C_{14}$ aldehyde.

Maximum yields are obtained when using methyl or ethyl chloroacetate as lower alkyl chloroacetate, and sodium methylate as alkali metal alkoxide in the present process. While relative increases in yield of similar magnitude compared to those when operating in the absence of a solvent are obtained with the higher esters such as butyl chloroacetate, and with other alkali metal alkoxides such as lithium methylate, the maximum yield obtainable with the higher esters and lithium methylate is sometimes only slightly better than that obtainable with the methyl or ethyl chloroacetates and sodium methylate in the conventional process. Further, the optimum proportion of diluent to be employed varies somewhat with the solvent selected, but in any event substantial increases in yield of 5% or more are obtained when employing at least 30% by weight of diluent. In some instances, further increases in yield are observed with somewhat higher proportions of diluent. The optimum proportion, considering the cost of the solvent, the expense of solvent recovery, and the increase in yield, can be determined by routine experimentation.

The product may be recovered by conventional methods. In a typical procedure, the reaction mixture is poured into water, and the desired product is extracted from the aqueous medium by an immiscible solvent, such as hexane. To achieve maximum extraction of the $C_{14}$ aldehyde product from the aqueous layer, the extraction step may be carried out by employing multiple portions of the solvent. For instance, three portions of hexane have resulted in substantially complete extraction of the desired product from the aqueous layer. The combined extracts can then be washed with acidified water, e.g. water that has a pH of approximately 6.0–6.8, or washed alternately with water, a dilute acid, and again with water. The solvent can then be removed by evaporation at aspirator pressure, for instance, and an effective way to recover the desired product from the residue is by distillation under high vacuum. The product is a yellow oil which is obtained by distillation at 103° C. to 106° C./1.5 mm. Hg; it may be used with 1' pentol in the synthesis of vitamin A.

The following examples illustrate the present invention, but are not intended to limit it in any way.

Example I

A mixture of 234 g. (84.2%—1.04 moles) of distilled β-ionone, 260 g. (2.41 moles) of methyl chloroacetate and 380 g. of dry dimethyl formamide (44% by weight of the mixture) was cooled to −5° C. in a three-necked, two-liter flask equipped with a stirrer, thermometer and nitrogen inlet tube. With vigorous agitation 134 g. (2.48 moles) of 95 percent sodium methylate was shaken portionwise into the reaction mixture from a flask equipped with a rubber sleeve. The temperature was maintained between 0 and −5° C. during a four hour addition period. A pre-cooled solution of 117.8 g. (2.92 moles) of sodium hydroxide in 800 cc. of methanol was added during a one-half hour period, again maintaining a temperature of 0 to −5° C. The mixture was then stirred in a nitrogen atmosphere for an additional one-half hour. The reaction mixture was transferred into 1400 cc. of water and extracted four times with 800 cc. portions of hexane. The combined hexane extracts were then washed with water, the pH of which was adjusted to 6.5 with 50 percent sulfuric acid. The solvent was removed under reduced pressure followed by distillation of the residue under high vacuum. The distilled product, 200.6 g. was collected at 103–110° C./1 mm. and had the following properties: $n20/D=1.5110$; spectrophotometric assay=90.2% pure. This represents a yield of 84.8 percent of theory.

*Example II*

Example I is repeated employing pure crystalline β-ionone as the starting material. A 90% yield of $C_{14}$ aldehyde is obtained.

*Example III*

The process of Example I is repeated, but the amount of dimethyl formamide is reduced to 190 g. (28% by weight of the mixture of β-ionone, methyl chloroacetate, and dimethylformamide). A 78% yield of $C_{14}$ aldehyde is obtained.

*Example IV*

The process of Example I is repeated, but the amount of dimethyl formamide is increased to 1482 g. (75% by weight of the β-ionone, methyl chloroacetate, and diluent). The yield of $C_{14}$ aldehyde 85%.

*Example V*

Distilled β-ionone, 234 g. (1.11 mole) was reacted with 260 g. (2.41 mole) of methyl chloroacetate and 134 g. (2.48 mole) of sodium methylate as described in Example I with the exception that 392 g. of pyridine was used as the solvent for the reaction. The glycidic ester was saponified in the same manner with 164 g. of potassium hydroxide in 546 cc. of methanol. The distilled and pentane-recrystallized product weighed 193 g., $n_D^{20}=1.5112$, M.P.=0.1 to 0° C. This represents a yield of 84.6% from β-ionone.

*Example VI*

A mixture of 234 g. (91%—1.11 mole) of β-ionone, 260 g. (2.41 mole) of methyl chloroacetate and 134 g. of sodium methylate were reacted in the same manner as described in Example II. Three hundred eighty grams of dimethyl acetamide was used as the solvent for the reaction. $C_{14}$ aldehyde having $n20/D=1.5110$, and B.P. 104–108° C./1 mm. was obtained in substantially the same yield as in Example V.

*Example VII*

A mixture of 234 g. (91%—1.11 mole) of β-ionone, 249 g. (2.40 mole) of ethyl chloroacetate and 380 g. of dry dimethyl formamide was reacted with 134 g. of sodium methylate in the same manner as that described in Example I. The glycidic ester was saponified with a pre-cooled solution of 164 g. of potassium hydroxide in 546 cc. of methanol which was added during a one hour period. The mixture was then stirred an additional hour. The $C_{14}$ aldehyde was produced in approximately the same yield as in Example V, $n20/D=1.5112$, B.P. .04—.08° C./1 mm.

*Example VIII*

A mixture of 117 g. (85.6%—0.52 mole) of β-ionone, 181 g. (1.20 mole) of butyl chloroacetate and 190 g. of dry dimethyl formamide was reacted with 67 g. of sodium methylate in the same manner as that described in Example I. The glycidic ester was saponified with precooled solution of 164 g. of potassium hydroxide in 546 cc. of methanol which was added during a one hour period. The mixture was then stirred an additional two hours. The $C_{14}$ aldehyde produced was of approximately the same purity, $n20/D=1.511$, B.P. .04–.08° C./1 mm. and was obtained in approximately 75% yield.

*Example IX*

Sodium methylate, 75.0 g. (1.39 mole) was added to a mixture of 120 g. (85.3%, 0.53 mole) of β-ionone and 131.3 g. (1.22 mole) of methyl chloroacetate in the same manner as that described in Example I except that no solvent was present. The glycidic ester was saponified in the same manner with 58.5 g. of sodium hydroxide in 500 cc. of methanol. The distilled and pentane-recrystallized product weighed 72 g. and had the following refractive index: $n20/D=1.5110$. This represents a yield of approximately 66% of $C_{14}$ aldehyde and clearly demonstrates the unexpected results obtained by the present invention.

*Example X*

A mixture of 234 g. (85.6%—1.04 mole) of β-ionone, 260 g. (2.41 mole) of methyl chloroacetate and 134 g. of sodium methylate were reacted as previously described in Example I above with the exception that 380 g. of α-picoline was used as the diluent for the reaction. The distilled product, 188.4 g., $n20/D=1.5113$, was crystallized from pentane to yield 158.8 g. of purified product, $n20/D=1.5114$, M.P. 0° C. to −.1° C. This represents a yield of 74.2% of $C_{14}$ aldehyde.

*Example XI*

The procedure of Example X is repeated substituting 1000 g. of β-picoline as the diluent. A somewhat higher yield of $C_{14}$ aldehyde is recovered.

*Example XII*

The procedure of Example X is repeated substituting γ-picoline for α-picoline with similar results.

*Example XIII*

The procedure of Example I is repeated substituting lithium methylate for sodium methylate. A 72% yield of $C_{14}$ aldehyde is obtained.

*Example XIV*

The procedure of Example I is repeated substituting potassium ethylate for sodium methylate. An 80% yield of $C_{14}$ aldehyde is obtained.

*Example XV*

The procedure of Example I is repeated substituting N-ethyl acetamide for dimethyl formamide. A 77% yield of $C_{14}$ aldehyde is obtained.

What is claimed is:

1. In the Darzen's process for forming $C_{14}$ aldehyde which comprises (a) mixing β-ionone and an alkyl chloroacetate, the alkyl radical of which contains 1 to 4 carbon atoms, during the addition of small portions of dry, alcohol-free alkali metal alkoxide at a low temperature, (b) subsequent treatment of reaction mixture with cold methanolic sodium hydroxide at a low temperature and (c) subsequent recovery of $C_{14}$ aldehyde, the improvement which consists in adding an essentially anhydrous diluent during the mixing of the β-ionone and the alkyl chloroacetate, said diluent being selected from the group consisting of dimethyl formamide, pyridine, dimethylacetamide, N-ethyl acetamide, α-picoline, β-picoline, and γ-picoline.

2. The process of claim 1 wherein the solvent is pyridine.

3. The process of claim 1 wherein the solvent is dimethyl formamide.

4. The process of claim 1 wherein the alkyl chloroacetate is methyl chloroacetate.

5. The process of claim 1 wherein the alkyl chloroacetate is ethyl chloroacetate.

6. The process of claim 1 wherein the alkali metal alkoxide is sodium methoxide.

7. The process of claim 1 wherein the alkali metal alkoxide is potassium ethylate.

References Cited in the file of this patent

UNITED STATES PATENTS 2,451,740   Lindlar _____ Oct. 19, 1948